G. FLESHER.
EGG CARRIER.
APPLICATION FILED MAY 16, 1914.
1,134,445.
Patented Apr. 6, 1915.
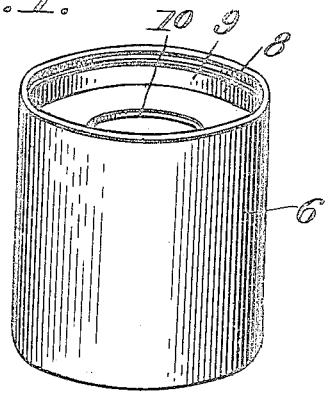
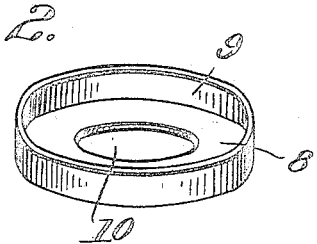
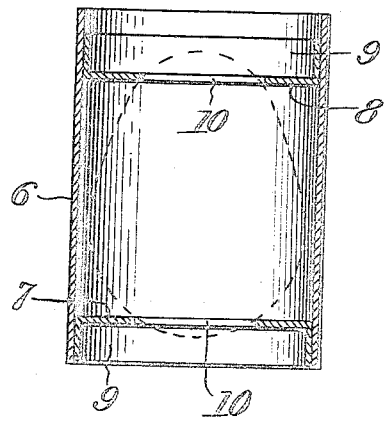

UNITED STATES PATENT OFFICE.

GEORGE FLESHER, OF CLEVELAND, OHIO.

EGG-CARRIER.

1,134,445.  Specification of Letters Patent.  Patented Apr. 6, 1915.

Application filed May 16, 1914. Serial No. 839,010.

*To all whom it may concern:*

Be it known that I, GEORGE FLESHER, citizen of the United States, residing at Cleveland, in the county of Cuyahoga and State of Ohio, have invented certain new and useful Improvements in Egg-Carriers, of which the following is a specification.

This invention relates to egg carriers, and has for its object to provide an improved and simple device by means of which eggs can be handled or transported without danger of breaking, the eggs being individually held in the respective carriers, which are thus capable of being handled singly for various purposes, each carrier containing a single egg. The eggs can be readily put in place in the carriers, and eggs of any size can be held therein.

One embodiment of the invention is illustrated in the accompanying drawings, in which:—

Figure 1 is a perspective view of the device. Fig. 2 is a perspective view of the removable head or end piece. Fig. 3 is a longitudinal section.

The carrier consists of a cylinder 6, and two heads or end pieces 7 and 8. These parts may be conveniently made of cardboard pressed or rolled and cut to shape, although any other suitable material may be used if desired. Card-board is desirable because it is cheap. The cylinder or tube 6 is large enough to receive an egg therein and sufficiently strong to resist ordinary crushing. The heads 7 and 8 are made cup shaped, or with a marginal flange 9, of the proper size to fit snugly within the cylinder, and each head has a central opening 10 to fit over the end of the egg. The head 7 is preferably fastened in any way, in one end of the cylinder, as by gluing, and preferably with the edge of the flange 9 flush with the end of the cylinder, thereby stiffening the cylinder at the end, and the flange is presented outwardly so that the body of the head is located a short distance in from the end of the cylinder, whereby the cylinder will project beyond the end of an egg held therein, thereby preventing said end from coming in contact with adjacent articles. The other head, 8, is removable, being slipped into the end of the cylinder and pressed down against the egg, with the end of the egg in the opening 10, and it may be pressed down far enough to engage an egg of any size so that under all conditions the latter will be held firmly in place. The egg may be removed by pushing on the exposed end thereof at the head 7, and the egg will be forced out, carrying with it the removable head 8.

The construction has many advantages. The contact of the heads with the ends of the egg, around the edge of the hole 10, holds the egg firmly in place so that it cannot vibrate in the cylinder, and the extended flanges of the heads and the ends of the cylinder protect the eggs from contact with other things. The removable head being adjustable permits the use of the same carrier for a large or a small egg, thereby giving great utility. The use of individual carriers enables any desired number of eggs to be shipped, without waste of space, and when each egg is inclosed in its individual carrier it may be piled in a basket or other container without regard to particular arrangement. Hence baskets, barrels, boxes or other receptacles of any kind may be used in transporting any quantity of eggs. They can be easily picked up by the hand, and counted out, from a large stock, and generally handled as individual eggs are handled, but without danger of breakage. Furthermore, the eggs can be candled without removing them from the holders, this action being permitted by the holes in the ends of the holder. For use in cold storage houses and elsewhere no crates will be necessary, since the eggs in the holders can be piled on shelves, or on the floor, and possibly handled with a shovel under certain conditions, with a little care. The danger of breakage is practically contingent only on the strength of the material used for the cylinder, and various materials are suitable for the purpose. The holder can be easily dated by a hand stamp, if desired, with the date of sale of the egg therein.

What I claim as new is:—

1. An individual egg carrier, comprising a cylindrical tube of proper size to receive a single egg, and heads fitting in the ends thereof, said heads having marginal flanges which project toward the ends of the tube when the heads are in place, and also having holes to receive the ends of the egg, one of said heads being slidable into and out of the tube and the said holes being open and unobstructed, whereby the egg may be candled while in the carrier.

2. An individual egg carrier, comprising a cylindrical tube of proper size to receive a single egg, and having disks in the ends thereof, tubular supporting members contacting with said disks and projecting toward the ends of the tube when the disks are in place, said disks also having holes to receive the ends of the egg, one of said disks being slidable into and out of the tube and the said holes being open and unobstructed whereby the egg may be candled while in the carrier.

In testimony whereof, I do affix my signature in presence of two witnesses.

GEORGE FLESHER.

Witnesses:
JOHN A. BOMMHARDT,
D. C. REED.